United States Patent
Yun et al.

(10) Patent No.: US 11,614,745 B2
(45) Date of Patent: Mar. 28, 2023

(54) MOVING ROBOT

(71) Applicant: LG ELECTRONICS INC., Seoul (KR)

(72) Inventors: Hyungtae Yun, Seoul (KR); Byounghee Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 198 days.

(21) Appl. No.: 16/993,325

(22) Filed: Aug. 14, 2020

(65) Prior Publication Data

US 2021/0048831 A1 Feb. 18, 2021

(30) Foreign Application Priority Data

Aug. 16, 2019 (KR) .................... 10-2019-0100105

(51) Int. Cl.
*G05D 1/02* (2020.01)
*B25J 9/16* (2006.01)
*G05D 1/00* (2006.01)

(52) U.S. Cl.
CPC .......... *G05D 1/0255* (2013.01); *B25J 9/1676* (2013.01); *B25J 9/1694* (2013.01); *G05D 1/0088* (2013.01); *G05D 1/0214* (2013.01); *G05D 1/0219* (2013.01); *G05D 2201/0215* (2013.01)

(58) Field of Classification Search
CPC .. G05D 1/0255; G05D 1/0088; G05D 1/0214; G05D 1/0219; G05D 2201/0215; G05D 2201/0208; G05D 1/0265; B25J 9/1676; B25J 9/1694; B25J 11/0085;

(Continued)

(56) References Cited

U.S. PATENT DOCUMENTS 10,366,585 B2 * 7/2019 Meyer ................. G08B 29/185
2008/0039974 A1 * 2/2008 Sandin ................. A01D 34/008
901/46

(Continued)

FOREIGN PATENT DOCUMENTS

CN 104737698 A 7/2015
EP 2939508 A1 11/2015

(Continued)

OTHER PUBLICATIONS

Korean Office Action for Korean Patent Application No. 10-2019-0100105, dated Jan. 22, 2021 (7 pages).

(Continued)

*Primary Examiner* — Nicholas Kiswanto
*Assistant Examiner* — Danielle Marie Jackson
(74) *Attorney, Agent, or Firm* — Birch, Stewart, Kolasch & Birch, LLP

(57) ABSTRACT

A mobile robot includes a body, a propulsion module, an ultrasound sensor module that is configured to detect a boundary of a cleaning area using a sound wave, and a controller configured to control the propulsion module based on the determined boundary. The ultrasound sensor module may include an ultrasonic sensor unit and a boundary detector. The sensor unit may emit the sound wave, receive the reflected sound wave from a target, and output a sound wave signal. And, the boundary detector may analyze the sound wave signal to detect the boundary of the cleaning area.

18 Claims, 11 Drawing Sheets

(58) Field of Classification Search
CPC ...... B25J 9/1602; B25J 9/1666; B25J 19/021; A01D 34/008
See application file for complete search history.

(56) References Cited

U.S. PATENT DOCUMENTS

| | | |
|---|---|---|
| 2013/0041526 A1 | 2/2013 | Ouyang |
| 2013/0060379 A1 | 3/2013 | Choe et al. |
| 2014/0180478 A1* | 6/2014 | Letsky ................. G05D 1/0231 700/258 |
| 2014/0214205 A1* | 7/2014 | Kwon ................. A47L 11/4011 700/258 |
| 2015/0366129 A1* | 12/2015 | Borinato ............. G05D 1/0278 701/25 |
| 2016/0366818 A1* | 12/2016 | Ouyang ................. G05D 1/028 |
| 2018/0255704 A1* | 9/2018 | Kamfors ............. G05D 1/0278 |
| 2020/0064857 A1* | 2/2020 | Gagne ..................... A47L 9/009 |
| 2020/0201328 A1* | 6/2020 | Abramson ............. G06V 20/58 |
| 2020/0345190 A1* | 11/2020 | Buehler ................. A47L 9/2847 |
| 2021/0116911 A1* | 4/2021 | Pjevach .............. H01M 50/204 |

FOREIGN PATENT DOCUMENTS

| | | |
|---|---|---|
| EP | 3495910 A1 | 6/2019 |
| KR | 10-2013-0079877 | 7/2013 |
| KR | 10-1537623 | 7/2015 |
| KR | 10-2015-0125305 | 11/2015 |

OTHER PUBLICATIONS

European Search Report for European Patent Application No. 20191122.9, dated Feb. 1, 2021 (8 pages).

* cited by examiner

MOVING ROBOT

TECHNICAL FIELD

The present disclosure relates to a moving robot. In particular, the present disclosure relates to a robot which detects an obstacle and a boundary of a cleaning area using, for example, an ultrasonic sensor.

BACKGROUND

A robot has been developed for industrial use and has been responsible for a portion of factory automation. In recent years, the field of application of the robot has been further expanded. For example, a medical robot, an aerospace robot, or the like have been developed and a home robot that can be used at home has also been developed. Among these robots, a robot capable of traveling by itself is called a moving robot. A typical example of a moving robot used in an outdoor environment of a home is a lawn mowing robot.

In a case of a moving robot autonomously traveling indoors, the areas that the robot can move in (or a movable area) is limited by walls or furniture, but in a case of a mobile robot autonomously traveling outdoors, there is a need to set a movable area in advance. In addition, there is a need to limit the movable area so that, for example, a lawn mowing robot travels in an area where grass is planted.

In Korean Patent Publication Laid-Open No. 2015-0125508, a wire is buried to set an area in which a lawn mower robot is to be moved, and the lawn mower robot senses a magnetic field formed by a current flowing through the wire and can move within the area set by the wire.

In some cases, an ultrasonic sensor is used to detect an obstacle. The moving robot uses the ultrasonic sensor for detecting the obstacle and a magnetic field sensor for detecting a boundary of the cleaning area in order to travel the cleaning area. Therefore, a plurality of sensors are used to determine the boundary and obstacle for traveling. Accordingly, the following problems can occur. There may be an increase in development time and development cost to develop an algorithm for each sensor separately, the manufacturing cost of the robot may increase, and a size of the moving robot may increase.

SUMMARY

The present disclosure provides a moving robot which detects an obstacle and a boundary of a cleaning area using, for example, an ultrasonic sensor.

The present disclosure also provides a moving robot which extracts an obstacle signal and a noise signal from a received sound wave signal using a plurality of filters to detect a boundary with the obstacle so as to correctly detect a distance from the boundary.

The present disclosure also provides a moving robot which can easily and correctly recognize a boundary of the cleaning area.

The present disclosure also provides a moving robot which uses a sensor for recognizing the obstacle as the sensor for recognizing the boundary without attaching an additional sensor.

In order to achieve these objects, the present disclosure analyzes a sound wave signal to detect an obstacle and a boundary of the cleaning area.

In one aspect, there is provided a moving robot including: a body; a traveler which moves the body; an ultrasound sensor module which detects an obstacle and a boundary of a cleaning area using a sound wave; and a controller which controls the traveler based on the obstacle and the boundary of the cleaning area detected by the ultrasonic sensor module, in which the ultrasound sensor module includes an ultrasonic sensor unit which emits the sound wave and receives the sound wave which hits a target and is returned to output a sound wave signal, an obstacle detector which analyzes the sound wave signal output from the ultrasonic sensor unit to determine the obstacle, and a boundary detector which analyzes the sound wave signal output from the ultrasonic unit to detect a boundary of the cleaning area.

The boundary detector may extract a noise signal generated by an electromagnetic wave generated by a boundary wire defining the cleaning area, from the sound wave signal, and analyze the noise signal to determine a boundary of the cleaning area.

The boundary detector may compare a frequency of an AC current applied to the boundary wire with a frequency of the noise signal to determine the boundary of the cleaning area.

When a frequency of the noise signal is 98% to 102% of a frequency of an AC current applied to the boundary wire, the boundary detector may determine the boundary as the boundary of the cleaning area.

When a frequency of the noise signal is included in a range of a reference frequency, the boundary detector may determine the boundary as the boundary of the cleaning area.

The boundary detector may include a noise extraction filter which extracts the noise signal from the sound wave signal.

The noise extraction filter may include a band pass filter.

The ultrasonic sensor module may further include a receiving amplifier which amplifies the sound wave signal output from the ultrasonic sensor unit.

The obstacle detector may extract an obstacle signal obtained by removing a noise signal from the sound wave signal and analyze the obstacle signal to detect the obstacle.

The obstacle detector may include an obstacle extraction filter which extracts the obstacle signal from the sound wave signal.

The obstacle extraction filter may include a band cutoff filter.

In another aspect, there is provided a moving robot including: a body; a traveler which moves the body; an ultrasound sensor module which detects a boundary of a cleaning area using a sound wave; and a controller which controls the traveler based on the boundary of the cleaning area detected by the ultrasonic sensor module, in which the ultrasound sensor module includes an ultrasonic sensor unit which emits the sound wave and receives the sound wave which hits a target and is returned to output a sound wave signal, and a boundary detector which analyzes the sound wave signal output from the ultrasonic unit to detect the boundary of the cleaning area.

The boundary detector may extract a noise signal generated by an electromagnetic wave generated by a boundary wire defining the cleaning area, from the sound wave signal, and analyzes the noise signal to determine a boundary of the cleaning area.

The boundary detector may compare a frequency of an AC current applied to the boundary wire with a frequency of the noise signal to determine the boundary of the cleaning area.

When a frequency of the noise signal is 98% to 102% of a frequency of an AC current applied to the boundary wire, the boundary detector may determine the boundary as the boundary of the cleaning area.

When a frequency of the noise signal is included in a range of a reference frequency, the boundary detector may determine the boundary as the boundary of the cleaning area.

The boundary detector may include a noise extraction filter which extracts the noise signal from the sound wave signal.

The noise extraction filter may include a band pass filter.

The ultrasonic sensor module may further include a receiving amplifier which amplifies the sound wave signal output from the ultrasonic sensor unit.

In still another aspect, there is provided a method of controlling a moving robot including: emitting a sound wave; receiving the sound wave which is reflected and returned to generate a sound wave signal; extracting a noise signal generated by an electromagnetic wave from the sound wave signal; and analyzing the noise signal to determine a boundary of a cleaning area.

DESCRIPTION OF EXEMPLARY EMBODIMENTS

Figure 1:
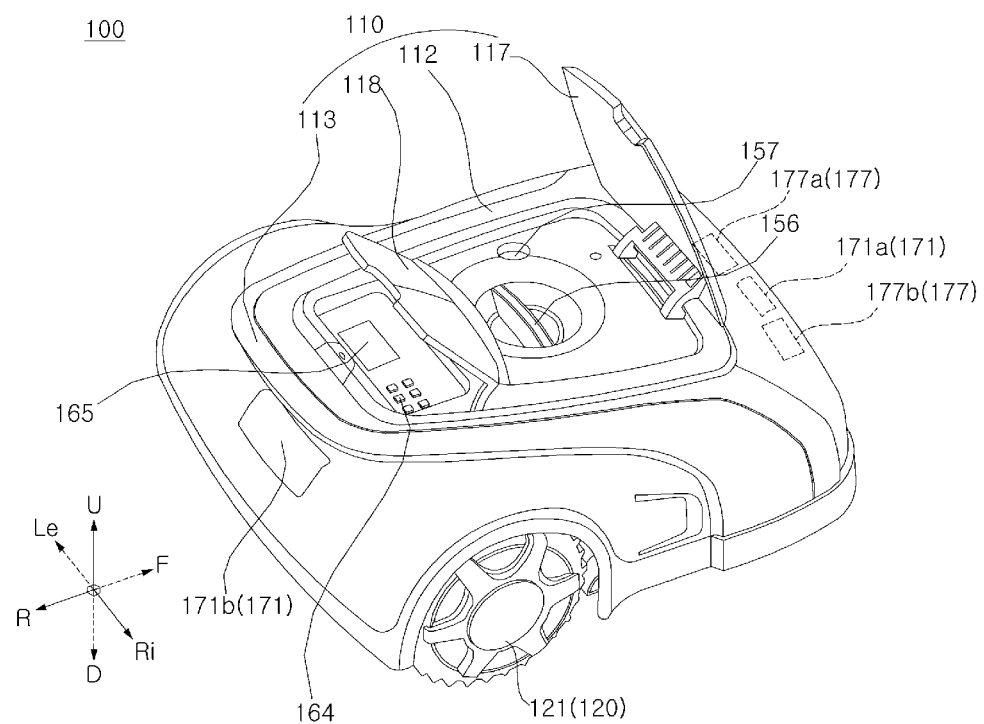
FIG. 1 is a perspective view illustrating a moving robot according to an embodiment of the present disclosure.
Figure 2:
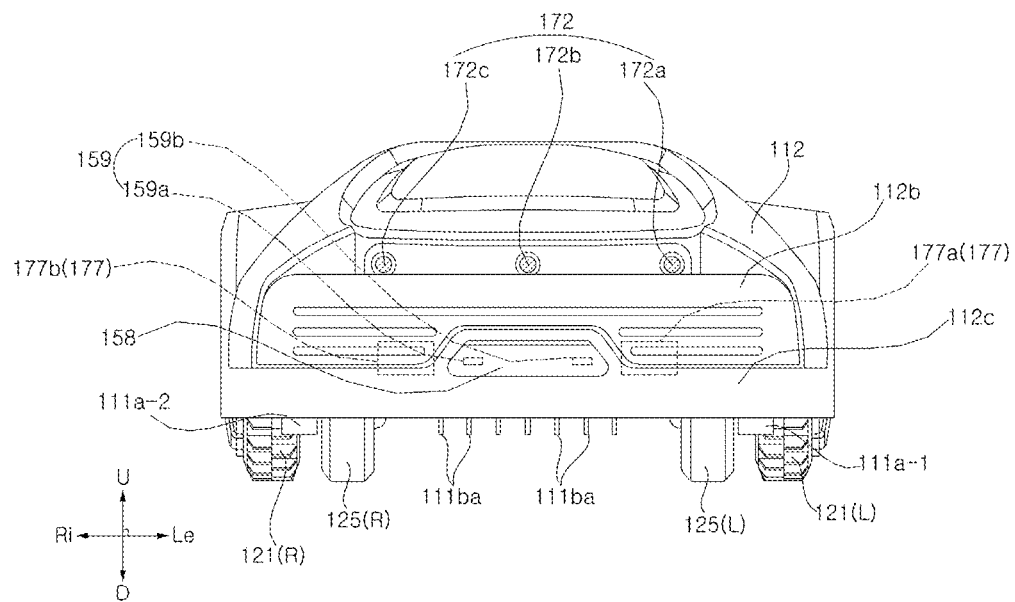
FIG. 2 is an elevational view when viewing a front surface of the moving robot of FIG. 1.
Figure 3:
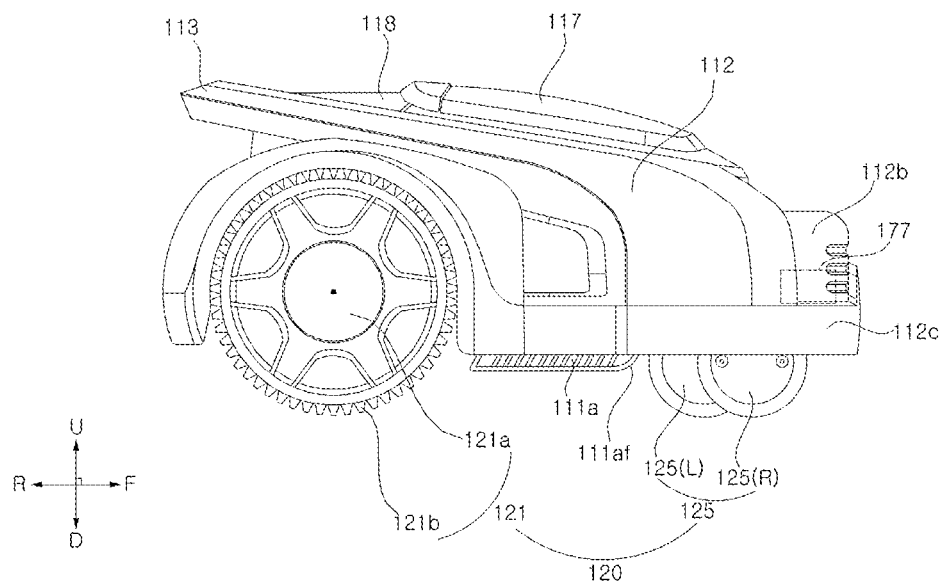
FIG. 3 is an elevational view when viewing a right surface of the moving robot of FIG. 1.
Figure 4:
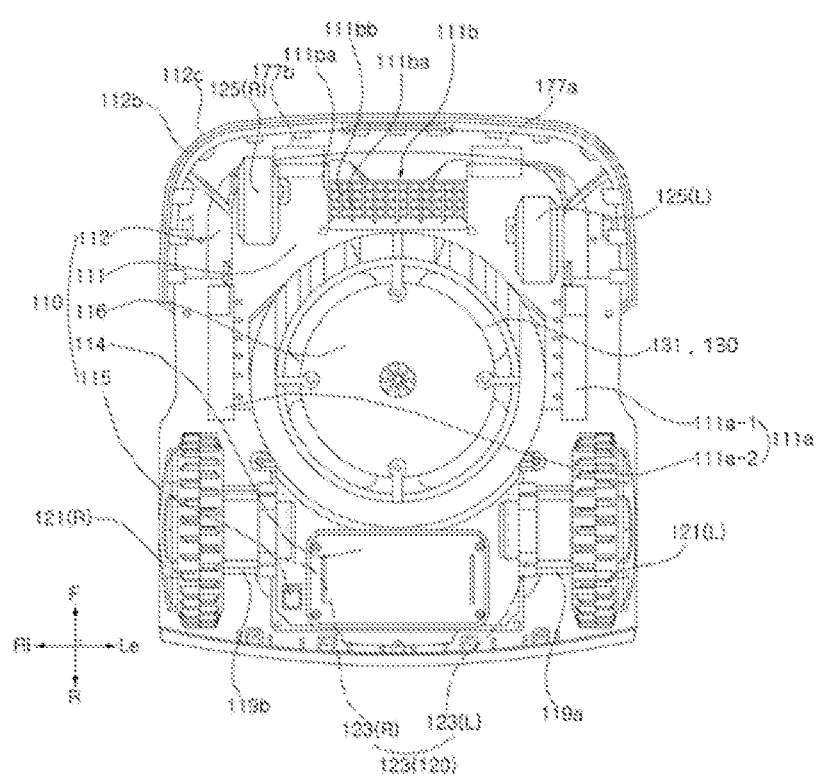
FIG. 4 is an elevational view when viewing a lower surface of the moving robot of FIG. 1.

Expressions referring to directions such as "front (F)/rear (R)/left (Le)/right (Ri)/up (U)/down (D)" mentioned below are defined as indicated in the drawings. However, these expressions are used only to explain the present disclosure so that the present disclosure can be clearly understood, and the directions may be differently defined depending on a criterion.

Use of terms "first and second" in front of components mentioned below is only to avoid confusion of the referred component, and is independent of an order, importance, or master/slave relationship between the components. For example, an embodiment including only the second component without the first component can be implemented.

In the drawings, a thickness or a size of each component is exaggerated, omitted, or schematically illustrated for convenience and clarity of the explanation. The size and area of each component do not entirely reflect the actual size or area.

An angle and a direction mentioned in describing a structure of the present disclosure are based on those described in the drawings. In description of a structure in the specification, if a reference point and a positional relationship with respect to the angle are not explicitly mentioned, reference is made to the related drawings.

Hereinafter, a lawn mowing robot 100 will be described as an example of a moving robot (or a mobile robot) with reference to FIGS. 1 to 6, but the present disclosure is not limited thereto. That is, aspects of the current disclosure can be applied to any type of a mobile robot.

Referring to FIGS. 1 to 4, the mobile or moving robot 100 includes a body 110 which forms an exterior. The body 110 forms an interior space. The moving robot 100 includes a propulsion unit or a traveler 120 which moves the body 110 with respect to a traveling surface. The moving robot 100 includes an operating module (or an operator 130) which performs a predetermined desired operation or task.

The body 110 includes a frame 111 to which the driving motor module 123 to be described later is fixed. A blade motor 132 to be described later is fixed to the frame 111. The frame 111 supports a battery to be described later. The frame 111 provides a skeleton structure which supports various other parts. The frame 111 is supported by an auxiliary wheel 125 and a driving wheel 121.

The body 110 includes a side blocking portion 111a for preventing a finger of a user from entering a blade 131 from both sides of the blade 131. The side blocking portion 111a is fixed to the frame 111. The side blocking portion 111a is disposed to protrude downward compared to a lower surface of other portions of the frame 111. The side blocking portion 111a is disposed to cover an upper part of a space between the driving wheel 121 and the auxiliary wheel 125.

A pair of side blocking portions 111a-1 and 111a-2 are disposed right and left with the blade 131 therebetween. The side blocking portion 111a is disposed to be spaced apart at a predetermined distance from the blade 131.

A front surface 111af of the side blocking portion 111a is formed to be round. The front surface 111af forms a surface which is bent upward to be rounded forward from a lower surface of the side blocking portion 111a. By using the shape of the front surface 111af, when the moving robot 100 moves forward, the side blocking portion 111a can easily ride over a lower obstacle below a predetermined reference.

The body 110 includes a front blocking portion 111b for preventing the finger of the user from entering the blade 131 in front of the blade 131. The front blocking portion 111b is fixed to the frame 111. The front blocking portion 111b is disposed to cover a portion of an upper portion of a space between the pair of auxiliary wheels 125L and 125R.

The front blocking portion 111b includes a protruding rib 111ba protruding downward compared to a lower surface of the other portions of the frame 111. The protruding rib 111ba extends in a front-rear direction (with reference to the axis illustrated in the figures). An upper end of the protruding rib 111ba is fixed to the frame 111, and a lower end of the protruding rib 111ba forms a free end.

A plurality of protruding ribs 111ba may be spaced apart in the left-right direction. A plurality of protruding ribs 111ba may be disposed parallel to each other. A gap is formed between two adjacent protruding ribs 111ba.

A front surface of the protruding rib 111ba is formed to be round. The front surface of the protruding rib 111ba forms a surface which is bent upward to be rounded forward from a lower surface of the protruding rib 111ba. By using the shape of the front surface of the protruding rib 111ba, when the moving robot 100 moves forward, the protruding rib 111ba 111a can easily ride over a lower obstacle below a predetermined reference.

The front blocking portion 111b includes an auxiliary rib 111bb to assist stiffness. The auxiliary rib 111bb for reinforcing the stiffness of the front blocking portion 111b is disposed between upper ends of the two adjacent protruding ribs 111ba. The auxiliary rib 111bb may be formed to protrude downward and extend in a lattice shape.

A caster (not illustrated) for rotatably supporting the auxiliary wheel 125 is disposed on the frame 111. The caster is rotatably disposed with respect to the frame 111. The caster is rotatably provided about a vertical axis. The caster is disposed below the frame 111. A pair of casters corresponding to the pair of auxiliary wheels 125 is provided.

The body 110 includes a case 112 which covers the frame 111 from above. The case 112 forms an upper surface and front/rear/left/right surfaces of the moving robot 100.

The body 110 may include a case connector (not illustrated) which fixes the case 112 to the frame 111. The case 112 may be fixed to an upper end of the case connector. The case connector may be disposed to be movable in the frame 111. The case connector may be disposed to be movable only in an up-down direction with respect to the frame 111. The case connector may be provided to be able to be movable only within a predetermined range. The case connector is movable integrally with the case 112. Accordingly, the case 112 is movable relative to the frame 111.

The body 110 includes a bumper 112b disposed in a front portion thereof. The bumper 112b absorbs an impact when the bumper 112b comes in contact with an external obstacle. In a front surface portion of the bumper 112b, a bumper groove is formed, which is recessed rearward and formed to be elongated in the right-left direction. A plurality of bumper grooves may be arranged spaced apart in the up-down direction. A lower end of the protruding rib 111ba is disposed at a lower position than a lower end of the auxiliary rib 111bb.

In the bumper 112b, a front surface and right and left side surfaces are formed to be connected to each other. The front surface and the side surfaces of the bumper 112b are connected to each other to be rounded.

The body 110 may include a bumper auxiliary portion 112c which is disposed to surround an outer surface of the bumper 112b. The bumper auxiliary part 112c is coupled to the bumper 112b. The bumper auxiliary portion 112c surrounds a lower portion and lower portions of right and left sides of a front surface of the bumper 112b. The bumper auxiliary portion 112c may cover the front surface and lower half portions of the right and left sides of the bumper 112b.

A front end surface of the bumper auxiliary portion 112c is disposed in front of a front end surface of the bumper 112b. The bumper auxiliary portion 112c forms a surface protruding from a surface of the bumper 112b.

The bumper auxiliary portion 112c may be formed of a material which is advantageous for shock absorption, such as, for example, rubber. The bumper auxiliary part 112c may be formed of any flexible material.

The frame 111 may include a movable fixing portion (not illustrated) to which the bumper 112b is fixed. The movable fixing portion may be disposed to protrude upwardly of the frame 111. The bumper 112b may be fixed to an upper end of the movable fixing portion.

The bumper 112b may be disposed to be movable within a predetermined range with respect to the frame 111. The bumper 112b is fixed to the movable fixing portion and can move integrally with the movable fixing portion.

The movable fixing portion may be disposed to be movable with respect to the frame 111. The movable fixing portion may be provided so that the movable fixing portion is rotatable within a predetermined range with respect to the frame 111 about a virtual rotation axis. Accordingly, the bumper 112b may be rotatably provided integrally with the movable fixing portion with respect to the frame 111.

The body 110 includes a handle 113. The handle 113 may be disposed on a rear side of the case 112.

The body 110 includes a battery input portion 114 through which a battery is taken in or out. The battery input portion 114 may be disposed on a lower surface of the frame 111. The battery input unit 114 may be disposed on a rear side of the frame 111.

The body 110 includes a power switch 115 for turning on/off power of the moving robot 100. The power switch 115 may be disposed on the lower surface of the frame 111.

The body 110 includes a blade protector 116 which covers a lower side of a central portion of the blade 131. The blade protector 116 is provided so that a blade of the radially outward, or a centrifugal, portion of the blade 131 is exposed, but the central portion of the blade 131 is covered.

The body 110 includes a first opening/closing unit 117 which opens and closes a portion where a height adjuster 156 and a height display 157 are disposed. The first opening and closing portion 117 is hinged to the case 112 and is provided to enable opening and closing operations. The first opening/closing portion 117 is disposed on an upper surface of the case 112

The first opening/closing portion 117 is formed in a plate shape, and covers upper sides of the height adjuster 156 and the height display 157 in a closed state.

The body 110 includes a second opening/closing unit 118 for opening and closing a portion where a display module 165 and an input unit 164 are disposed. The second opening/closing unit 118 is hinged to the case 112 and is provided to enable opening and closing operations. The second opening/closing portion 118 is disposed on the upper surface of the case 112. The second opening/closing unit 118 is disposed behind the first opening/closing unit 117.

The second opening/closing unit 118 is formed in a plate shape, and covers the display module 165 and the input unit 164 in a closed state.

An openable angle of the second opening/closing unit 118 is preset to be smaller than an openable angle of the first opening/closing unit 117. Accordingly, even in an open state of the second opening/closing unit 118, the user can easily open the first opening/closing unit 117, and the user can easily operate the height adjuster 156. In addition, even in the open state of the second opening/closing unit 118, the user can visually check a content of the height display 157.

For example, the openable angle of the first opening/closing unit 117 may be provided to be about 80 to 90° based on the closed state. For example, an openable angle of the second opening/closing unit 118 may be provided to be about 45 to 60° based on the closed state.

In the first opening/closing unit 117, a rear end thereof is raised upward with a front end thereof as a center, and thus, the first opening/closing unit 117 is opened. Moreover, in the second opening/closing unit 118, a rear end thereof is raised upward with a front end thereof as a center, and thus, the second opening/closing unit 118 is opened. Accordingly, the user can open and close the first opening/closing unit 117 and the second opening/closing unit 118 from a rear side of the lawn mowing robot 100, which is a safe area even when the lawn mowing robot 100 moves forward. In addition, the opening operation of the first opening/closing unit 117 and the opening operation of the second opening/closing unit 118 may be prevented from interfering with each other.

The first opening/closing unit 117 may be provided to be rotatable with respect to the case 112, about a rotation axis extending in the right-left direction on the front end of the first opening/closing unit 117. The second opening/closing unit 118 may be provided to be rotatable with respect to the case 112, about a rotation axis extending in a right-left direction on the front end of the second opening/closing unit 118.

The body 110 may include a first motor housing 119a accommodating a first driving motor 123(L) therein, and a second motor housing 119b accommodating the second driving motor 123(R) therein. The first motor housing 119a may be fixed to a left side of the frame 111, and the second motor housing 119b may be fixed to a right side of the frame 111. A right end of the first motor housing 119a is fixed to the frame 111. A left end of the second motor housing 119b is fixed to the frame 111.

The first motor housing 119a is formed in a cylindrical shape forming a height from side to side. The second motor housing 119b is formed in a cylindrical shape forming a height from side to side.

The propulsion unit or traveler 120 includes a drive wheel 121 which is rotated by a driving force of the drive motor module 123. The traveler 120 may include at least one pair of drive wheels 121 which is rotated by the driving force of the drive motor module 123. The driving wheel 121 includes a first wheel 121(L) and a second wheel 121(R) provided on the left and right sides so as to be independently rotatable. The first wheel 121(L) is disposed on the left side, and the second wheel 121(R) is disposed on the right side. The first wheel 121(L) and the second wheel 121(R) are spaced apart from side to side. The first wheel 121(L) and the second wheel 121(R) are disposed on a lower rear side of the body 110.

The first wheel 121(L) and the second wheel 121(R) are provided to be rotatable independently so that the body 110 can rotate and move forward with respect to the ground. For example, when the first wheel 121(L) and the second wheel 121(R) rotate at the same rotational speed, the body 110 may move forward with respect to the ground. For example, when the rotational speed of the first wheel 121(L) is faster than the rotational speed of the second wheel 121(R) or when a rotational direction of the first wheel 121(L) and a rotational direction of the second wheel 121(R) are different from each other, the body 110 may turn or rotate with respect to the ground.

The first wheel 121(L) and the second wheel 121(R) may be formed larger than the auxiliary wheel 125. A shaft of the first driving motor 123(L) may be fixed to a center portion of the first wheel 121(L), and a shaft of the second driving motor 123(R) may be fixed to a center portion of the second wheel 121(R).

The driving wheel 121 includes a wheel outer peripheral portion 121b which is in contact with the ground. For example, the wheel outer portion 121b may be a tire. A plurality of protrusions for increasing a frictional force with the ground may be formed on the wheel outer peripheral portion 121b.

The driving wheel 121 may include a wheel frame (not illustrated) which fixes the wheel outer peripheral portion 121b and receives power from the motor 123. The shaft of the motor 123 is fixed to a center portion of the wheel frame, and thus, a rotational force can be transmitted to the wheel frame. The wheel outer peripheral portion 121b is disposed to surround a periphery of the wheel frame.

The driving wheel 121 includes a wheel cover 121a covering an outer surface of the wheel frame. The wheel cover 121a is disposed in a direction opposite to a direction in which the motor 123 is disposed based on the wheel frame. The wheel cover 121a is disposed at the center portion of the wheel outer peripheral portion 121b.

The traveler 120 includes the driving motor module 123 which generates a driving force. The traveler 120 includes the drive motor module 123 which provides the driving force to the driving wheel 121. The driving motor module 123 includes the first driving motor 123(L) which provides the driving force to the first wheel 121(L), and the second driving motor 123(R) which provides the driving force to the second wheel 121(R). The first driving motor 123(L) and the second driving motor 123(R) may be disposed spaced apart from side to side. The first driving motor 123(L) may be disposed on a left side of the second driving motor 123(R).

The first driving motor 123(L) and the second driving motor 123(R) may be disposed on the lower portion of the body 110. The first driving motor 123(L) and the second driving motor 123(R) may be disposed at the rear portion of the body 110.

The first driving motor 123(L) may be disposed on a right side of the first wheel 121(L), and the second driving motor 123(R) may be disposed on a left side of the second wheel 121(R). The first driving motor 123(L) and the second driving motor 123(R) are fixed to the body 110.

The first driving motor 123(L) is disposed inside the first motor housing 119a, and the motor shaft may protrude to the left. The second driving motor 123(R) is disposed inside the second motor housing 119b, and the motor shaft may protrude to the right.

In the present embodiment, the first wheel 121(L) and the second wheel 121(R) are directly connected to a rotating shaft of the first driving motor 123(L) and a rotating shaft of the second driving motor 123(R), respectively. However, a component such as a shaft may be connected to the first wheel 121(L) and the second wheel 121(R), a rotational force of the motors 123(L) and 123(R) may be transmitted to the wheels 121a and 120b via a gear or chain.

The traveler 120 may include the auxiliary wheel 125 which supports the body 110 together with the driving wheel 121. The auxiliary wheel 125 may be disposed in front of the blade 131. The auxiliary wheel 125 is a wheel which does not receive the driving force from the motor, and serves to assist or support the body 110 with respect to the ground. A caster supporting a rotating shaft of the auxiliary wheel 125 is coupled to the frame 111 to be rotatable about a vertical axis. The first auxiliary wheel 125(L) disposed on the left side and the second auxiliary wheel 125(R) disposed on the right side may be provided.

The operating module, or operator 130, is provided to perform a predetermined task. The operator 130 is disposed on the body 110.

For example, the operator 130 may be provided to perform operations such as cleaning or lawn mowing. As another example, the operator 130 may be provided to perform an operation such as transporting an object or finding an object. As still another example, the operator 130 may perform a security function for detecting an external intruder or a dangerous situation.

In the present embodiment, the operator 130 is described as performing mowing. However, this is only exemplary. The type of operation that may be performed by the operating modules, or operators 130, of different embodiments of the current disclosure may be various, and not limited by the described example.

The operator 130 may include the blade 131 rotatably provided to mow the lawn. The operator 130 may include a blade motor 132 which provides a rotational force to the blade 131.

The blade 131 is disposed between the driving wheel 121 and the auxiliary wheel 125. The blade 131 is disposed on the lower portion of the body 110. The blade 131 is provided to be exposed from the lower side of the body 110. The blade 131 rotates around a rotation axis extending in an up-down direction to mow the lawn.

The blade motor 132 may be disposed in front of the first wheel 121(L) and the second wheel 121(R). The blade motor 132 is disposed in a lower portion of a central portion in an inner space of the body 110.

The blade motor 132 may be disposed behind the auxiliary wheel 125. The blade motor 132 may be disposed in the lower portion of the body 110. The rotational force of the motor shaft is transmitted to the blade 131 using a structure such as a gear.

The moving robot 100 includes a battery (not illustrated) which supplies power to the driving motor module 123. The battery provides power to the first driving motor 123(L). The battery provides power to the second driving motor 123(R). The battery may supply power to the blade motor 132. The battery may provide power to a controller 190, an azimuth sensor 176, and an output unit 165. The battery may be disposed on a lower side of a rear portion in the inner space of the body 110.

The moving robot 100 is provided to change a height of the blade 131 with respect to the ground, and thus, can change a mowing height of the grass. The moving robot 100 includes the height adjuster 156 for the user to change the height of the blade 131. The height adjuster 156 may include a rotatable dial, and the dial is rotated to change the height of the blade 131.

The moving robot 100 includes a height display 157 which displays a level of the height of the blade 131. When the height of the blade 131 is changed according to an operation of the height adjuster 156, the height level displayed by the height display 157 is also changed. For example, the height display 157 may display a predicted height value of the grass after the moving robot 100 performs lawn mowing with a current height of the blade 131.

The moving robot 100 includes a docking insertion 158 which is connected to a docking device 200 when the moving robot 100 docks with the docking device 200. The docking insertion 158 is provided to be recessed to be inserted into the docking connector 210 of the docking device 200. Although not a requirement, in some embodiments, the docking insertion 158 is disposed on the front surface portion of the body 110. The moving robot 100 can be correctly guided when being charged by the connection of the docking insertion 158 and the docking connector 210.

The moving robot 100 may include a charging corresponding terminal 159 disposed at a position contactable with a charging terminal 211 to be described later in a state where the docking insertion 158 is inserted into the docking connector 210. The charging corresponding terminal 159 may include a pair of charging corresponding terminals 159a and 159b disposed at positions corresponding to the pair of charging terminals 211 (211a and 211b). The pair of charging correspondence terminals 159a and 159b may be disposed left and right in a state where the docking insertion portion 158 is interposed therebetween.

A terminal cover (not illustrated) may be provided to cover the docking insertion 158 and the pair of charging terminals 211 (211a, 211b) so as to be opened and closed. When the moving robot 100 travels, the terminal cover may cover the docking insertion 158 and the pair of charging terminals 211 (211a and 211b). When the moving robot 100 is connected to the docking device 200, the terminal cover is opened, and the docking insertion 158 and the pair of charging terminals 211, 211a, 211b may be exposed.

Figure 5:
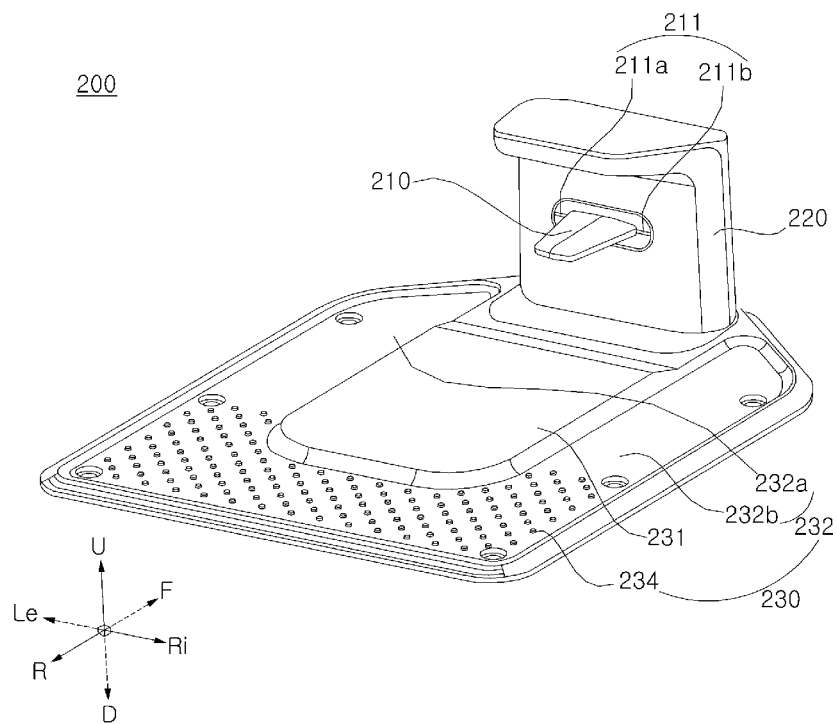
FIG. 5 is a perspective view illustrating a docking device which docks the moving robot of FIG. 1.
Figure 6:
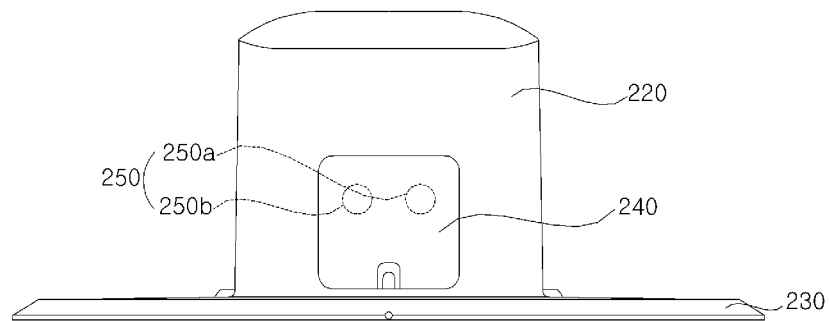
FIG. 6 is an elevational view when the docking device of FIG. 5 is viewed from the front.

Meanwhile, referring to FIGS. 5 and 6, the docking device 200 includes a docking base 230 disposed on the floor and a docking support 220 protruding upwardly from a front portion of the docking base 230.

The docking base 230 defines a surface parallel in a horizontal direction. The docking base 230 has a plate shape so that the moving robot 100 can be seated. The docking support 220 extends from the docking base 230 in a direction crossing the horizontal direction.

The moving robot 100 includes the docking connector which is inserted into the docking insertion 158 when the moving robot 100 is charged. The docking connector may protrude rearward from the docking support 220.

The docking connector 210 may have a thickness in the up-down direction smaller than a width in the right-left direction. The width of the docking connector 210 in the right-left direction may narrowed rearward. When viewed from above, a shape of the docking connection 210 is trapezoidal in whole. The docking connector 210 is formed in a right and left symmetrical shape. A rear portion of the docking connector 210 forms a free end, and a front portion of the docking connector 210 is fixed to the docking support 220. The rear portion of the docking connector 210 may be formed in a rounded shape.

When the docking connector 210 is completely inserted into the docking insertion 158, the moving robot 100 may be charged by the docking device 200.

The docking device 200 includes the charging terminal 211 for charging the moving robot 100. The charging terminal 211 and the charging corresponding terminal 159 of the moving robot 100 come into contact with each other, and thus, power for charging may be supplied from the docking device 200 to the moving robot 100.

The charging terminal 211 includes a contact surface facing the rear side, and the charging corresponding terminal 159 includes a contact corresponding surface facing the front side. The contact surface of the charging terminal 211 and the contact corresponding surface of the charging corresponding terminal 159 come into contact with each other, and thus, the power of the docking device 200 is connected to the moving robot 100.

The charging terminal 211 may include the pair of charging terminals 211 (211a and 211b) forming positive and negative poles.

The first charging terminal 211(211a) is provided to come into contact with the first charging terminal 159a, and the second charging terminal 211 (211b) is provided to come into contact with the second charging terminal 159b.

The pair of charging terminals 211 (211a and 211b) may be disposed in a state where the docking connector 210 is interposed therebetween. The pair of charging terminals 211 (211a and 211b) may be disposed on right and left of the docking connector 210.

The docking base 230 includes a wheel guard 232 on which the driving wheel 121 and the auxiliary wheel 125 of the moving robot 100 ride. The wheel guard 232 includes a first wheel guard 232a which guides a movement of the first auxiliary wheel 125 and a second wheel guard 232b which guides a movement of the second auxiliary wheel 125. An upper convex center base 231 is disposed between the first wheel guard 232a and the second wheel guard 232b. The docking base 230 includes a slip prevention 234 for preventing slipping of the first wheel 121(L) and the second wheel 121(R). The slip prevention 234 may include a plurality of protrusions protruding upward.

Meanwhile, a boundary wire 290 for setting a boundary of a traveling area of the moving robot 100 may be implemented. The boundary wire 290 may generate a predetermined boundary signal. The moving robot 100 may detect a boundary signal and recognize a boundary of the traveling area set by the boundary wire 290.

For example, a predetermined current flows along the boundary wire 290 to generate a magnetic field around the boundary wire 290. Here, the generated magnetic field is a boundary signal. An AC current having a predetermined change pattern may flow through the boundary wire 290 so that the magnetic field generated around the boundary wire 290 may be changed to have a predetermined change pattern. The moving robot 100 can recognize that the moving robot 100 approaches the boundary wire 290 within a predetermined distance using a boundary signal detector 177 which detects the magnetic field, and thus, the moving robot 100 can travel only the traveling area within the boundary set by the boundary wire 290.

The boundary wire 290 may generate a magnetic field in a direction different from a reference wire. For example, the boundary wire 290 may be disposed substantially parallel to the horizontal plane. Here, the term "substantially parallel" is used to refer to parallelism in an engineering sense, including complete parallelism in a mathematical sense and including parallelism with a certain level (e.g., 5%, 10%, 15%, etc.) of error.

The docking device 200 may serve to transmit a predetermined current to the boundary wire 290. The docking device 200 may include a wire terminal 250 connected to the boundary wire 290. Both ends of the boundary wire 290 may be connected to a first wire terminal 250a and a second wire terminal 250b, respectively. When the boundary wire 290 and the wire terminal 250 are connected to each other, the power of the docking device 200 can supply a current to the boundary wire 290.

The boundary wire 290 defines a boundary of a cleaning area.

The wire terminal 250 may be disposed at a front portion F of the docking device 200. That is, the wire terminal 250 may be disposed on a side opposite to a direction in which the docking connector 210 protrudes. The wire terminal 250 may be disposed on the docking support 220. The first wire terminal 250a and the second wire terminal 250b may be disposed spaced apart from side to side.

The docking device 200 may include a wire terminal opening/closing portion 240 which covers the wire terminal 250 so that the wire terminal 250 can be opened or closed. The wire terminal opening/closing portion 240 may be disposed at the front portion F of the docking support 220. The wire terminal opening/closing portion 240 is hinged to the docking support 220 and may be preset to perform an opening/closing operation when the wire terminal opening/closing portion 240 is rotated.

Figure 7:
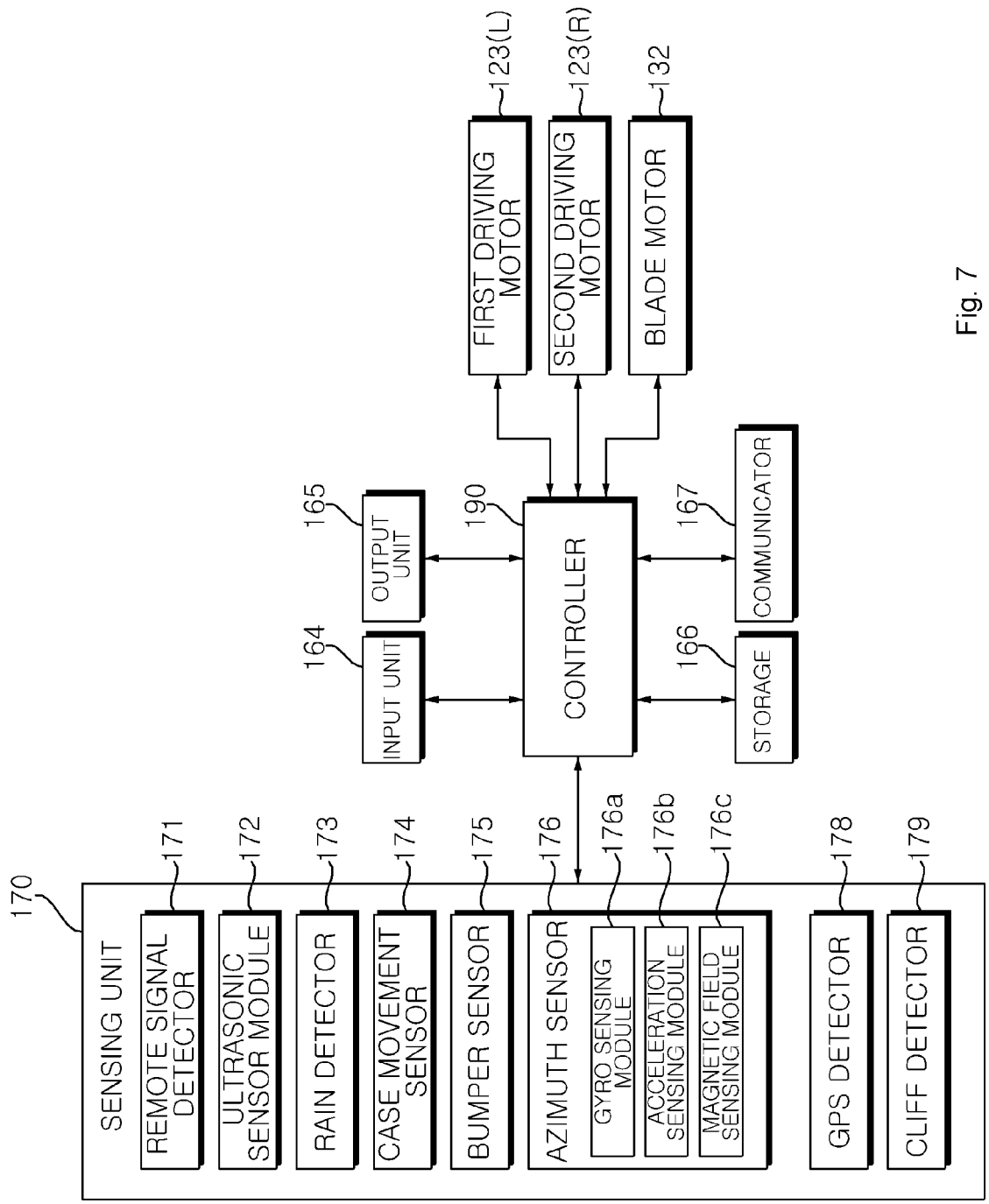
FIG. 7 is a block diagram illustrating a control relationship of the moving robot of FIG. 1.

FIG. 7 is a block diagram illustrating a control relationship of the moving robot 100 of FIG. 1. Meanwhile, referring to FIG. 7, the moving robot 100 may include the input unit 164 capable of inputting various instructions of the user. The input unit 164 may include a button, a dial, and a touch-type display. The input unit 164 may include a microphone (not illustrated) for speech recognition. In the present embodiment, a plurality of buttons are disposed on an upper portion of the case 112.

The moving robot 100 may include the output unit 165 which outputs various information to the user. The output unit 165 may include a display module which outputs visual information. The output unit 165 may include a speaker (not illustrated) which outputs auditory information.

In the present embodiment, the display module 165 outputs an image upward. The display module 165 is disposed on the upper portion of the case 112. As an example, the display module 165 may include a thin film transistor liquid-crystal display (LCD) panel. In addition, the display module 165 may be implemented using various display panels such as a plasma display panel or an organic light emitting diode display panel.

The moving robot 100 includes a storage medium/device (or storage 166) for storing various information. The storage 166 records various information necessary for the control of the moving robot 100, and may include a volatile or nonvolatile recording medium. The storage 166 may store information input from the input unit 164 or received by the communicator 167. A program for controlling the moving robot 100 may be stored in the storage 166.

The moving robot 100 may include a communication device or communicator 167 for communicating with an external device (terminal or the like), a server, a router, or the like. For example, the communicator 167 may be implemented to wirelessly communicate with wireless communication technologies such as IEEE 802.11 WLAN, IEEE 802.15 WPAN, UWB, Wi-Fi, Zigbee, Z-wave, and BlueTooth. The communicator may be changed depending on the communication method of another device or a server.

The moving robot 100 includes a sensing unit 170 which senses information related to a state of the moving robot 100 or an environment outside the moving robot 100. The sensing unit 170 may be include at least one of a remote signal detector 171, a ultrasonic sensor module, a rain sensor 173, a case movement sensor 174, a bumper sensor 175, azimuth sensor 176, boundary signal detector (177)), at least one of a GPS detection unit 178 and a cliff detection unit 179.

The remote signal detector 171 receives an external remote signal. When the remote signal is transmitted by an external remote controller, the remote signal detection unit 171 may receive the remote signal. For example, the remote signal may be an infrared signal. The signal received by the remote signal detector 171 may be processed by the controller 190.

A plurality of remote signal detectors 171 may be provided. The plurality of remote signal detectors 171 include a first remote signal detection unit 171a disposed on the front portion of the body 110 and a second remote signal detection unit 171b disposed on the rear portion of the body 110. The first remote signal detector 171a receives a remote signal transmitted from the front. The second remote signal detector 171b receives a remote signal transmitted from the rear.

The rain detector 173 detects rain when rain occurs in an environment where the moving robot 100 is placed. The rain detector 173 may be disposed in the case 112.

The case movement sensor 174 detects the movement of the case connector. When the case 112 is raised upward with respect to the frame 111, the case connector moves upward, and the case movement sensor 174 detects that the case 112 is raised. When the case movement sensor 174 detects that the case 112 is raised, the controller 190 may control to stop the operation of the blade 131. For example, when the user raises the case 112 or a situation in which the case 112 is raised by a lower obstacle having a significant size occurs, the case movement sensor 174 may detect this.

The bumper sensor 175 can detect a rotation of the movable fixing portion. For example, a magnet may be disposed on one side of the lower portion of the movable fixing portion, and a sensor which detects a change in the magnetic field of the magnet may be disposed on the frame 111. When the movable fixing portion rotates, the sensor detects the change in the magnetic field of the magnet, and thus, the bumper sensor 175 which detects the rotation of the movable fixing portion can be implemented. When the bumper 112b collides with an external obstacle, the movable fixing portion rotates integrally with the bumper 112b. The bumper sensor 175 may detect the rotation of the movable fixing portion, and thus, detect an impact of the bumper 112b.

A gyro sensing module 176a may acquire information on a rotational angular velocity with respect to a horizontal surface of the body 30. Specifically, the gyro sensing module 176a may detect the rotational angular speed about X and Y axes which are parallel to the horizontal surface and are perpendicular to each other. The rotational angular velocity about the horizontal surface can be calculated by synthesizing the rotational angular velocity (roll) about the X axis and the rotational angular velocity (pitch) about the Y axis through a processing module. The rotational angular velocity can be integrated through the processing module to calculate a tilt value.

The gyro sensing module 176a may detect a predetermined reference direction. A tilt information acquirer 180 may acquire tilt information based on a reference direction.

The azimuth sensor (AHRS) 176 may have a gyro sensing function. The azimuth sensor 176 may further include an acceleration sensing function. The azimuth sensor 176 may further include a magnetic field sensing function.

The azimuth sensor 176 may include a gyro sensing module 176a which performs gyro sensing. The gyro sensing module 176a may detect the horizontal rotational speed of the body 110. The gyro sensing module 176a may detect a tilting speed with respect to the horizontal surface of the body 110.

The gyro sensing module 176a may include a gyro sensing function for three axes of a spatial coordinate system orthogonal to each other. The information collected by the gyro sensing module 176a may be roll, pitch, and yaw information. The processing module can calculate direction angles of the cleaners 1 and 1' by integrating the angular velocities of rolling, pitching, and yawing.

The azimuth sensor 176 may include an acceleration sensing module 176b which performs acceleration sensing. The acceleration sensing module 176b may have an acceleration sensing function for the three axes of the spatial coordinate system orthogonal to each other. A processing module can calculate the speed by, for example, integrating the acceleration, and can calculate a moving distance by, for example, integrating the speed.

The azimuth sensor 176 may include a magnetic field sensing module 176c which performs magnetic field sensing. The magnetic field sensing module 176c may have a magnetic field sensing function for three axes of a spatial coordinate system orthogonal to each other. The magnetic field sensing module 176c may detect the magnetic field of the earth.

The GPS detector 178 may be provided to detect a Global Positioning System (GPS) signal. The GPS detector 178 may be implemented using a PCB.

The cliff detection unit 179 detects the presence of a cliff on the traveling surface. The cliff detection unit 179 is disposed on the front portion of the body 110 and can detect the presence or absence of a cliff in front of the moving robot 100.

The sensing unit 170 may include an opening/closing detector (not illustrated) which detects whether at least one of the first opening/closing unit 117 and the second opening/closing unit 118 is opened or closed. The opening/closing detector may be disposed in the case 112.

The moving robot 100 includes the controller 190 which controls autonomous traveling. The controller 190 may process a signal of the sensing unit 170. The controller 190 can process a signal of the input unit 164.

The controller 190 may control the driving of the first driving motor 123(L) and the second driving motor 123(R). The controller 190 may control the driving of the blade motor 132. The controller 190 can control the output of the output unit 165.

The controller 190 includes a control board or a main board (not illustrated) disposed in the inner space of the body 110. The main board may include a printed circuit board (PCB).

The controller 190 may control the autonomous driving of the moving robot 100. The controller 190 may control the driving of the traveler 120 based on the signal received from the input unit 164. The controller 190 may control the driving of the traveler 120 based on the signal received from the sensing unit 170.

The controller 190 may control the traveler (driving motor 123) based on an obstacle or/and a boundary of a cleaning area detected by the ultrasonic sensor module. Specifically, when the boundary of the cleaning area is detected in the ultrasonic sensor module, the controller 190 may set a location where the boundary signal is detected as a boundary of the traveling area. The controller 190 may travel the moving robot 100 within the boundary of the traveling area. When an obstacle is detected in the ultrasonic sensor module, the controller 190 may move the moving robot 100 by avoiding the position where the obstacle is detected.

The ultrasonic sensor module 172 detects an obstacle around the moving robot 100. The ultrasonic sensor module 172 may detect an obstacle in front of the moving robot 100. A plurality of ultrasonic sensor modules 172 172a, 172b, and 172c may be provided. The ultrasonic sensor module 172 is disposed on the front surface of the body 110. The ultrasonic sensor module 172 is disposed above the frame 111. The ultrasonic sensor module 172 may detect a boundary 290 of a cleaning area A1 as described below. Hereinafter, the ultrasonic sensor module 172 will be described.

Figure 8:
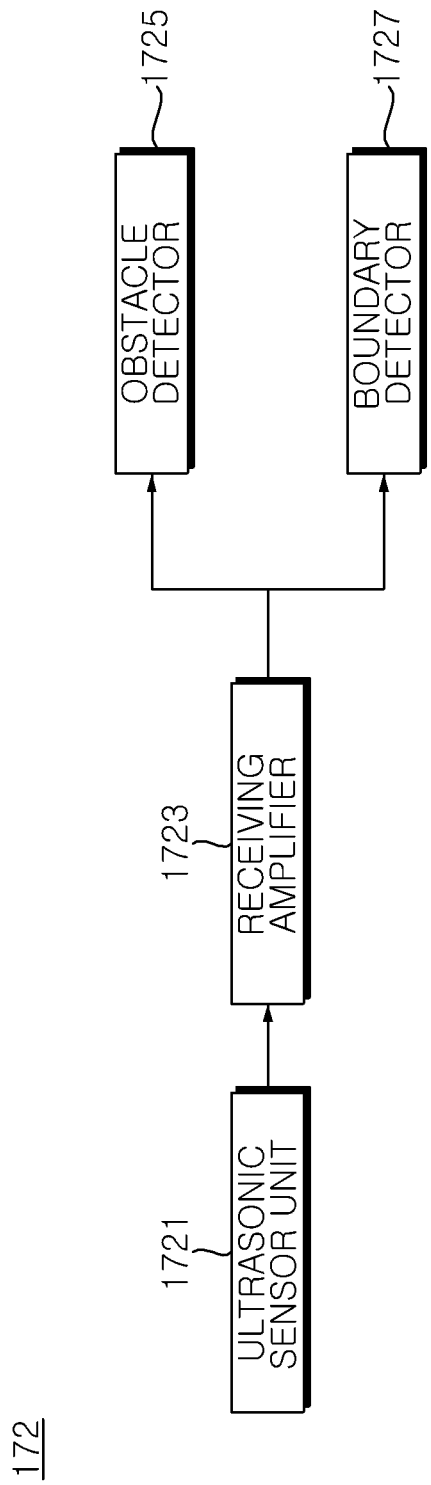
FIG. 8 is a configuration diagram of an ultrasonic sensor module of the present disclosure.

Referring to FIG. 8, the ultrasonic sensor module 172 will be described in detail. The ultrasonic sensor module 172 emits a sound wave and analyzes a reflected wave which is returned, and thus, can simultaneously determine the boundary of the cleaning area and the obstacle in the cleaning area.

For example, the ultrasonic sensor module 172 includes an ultrasonic sensor unit 1721, an obstacle detector 1725, and a boundary detector 1727. In addition, the ultrasonic sensor module 172 may further include a receiving amplifier 1723.

The ultrasonic sensor unit 1721 emits a sound wave, receives the sound wave which hits a target and is returned from the target, and outputs a sound wave signal. The ultrasonic sensor unit 1721 emits sound waves toward the front or both sides of the moving robot.

The receiving amplifier 1723 amplifies the sound wave signal output from the ultrasonic sensor unit 1721 and provides the amplified sound wave signal to the boundary detector 1717 and the obstacle detector 1725.

The boundary detector 1727 detects the boundary of the cleaning area by analyzing the sound wave signal output by the ultrasonic sensor unit 1721 (or amplified by the receiving amplifier 1723).

As an example, the boundary detector 1717 extracts a noise signal generated by an electromagnetic wave generated from the boundary wire 290 defining the cleaning area from the sound wave signal, and analyzes the noise signal to determine the boundary of the cleaning area.

An AC current is applied to the boundary wire 290, and the noise signal is detected by the ultrasonic sensor unit by the electromagnetic wave generated from the AC current. In the noise signals, a noise generated by the boundary wire 290 is detected to determine the boundary of the cleaning area.

Specifically, the boundary detector 1717 may include a noise extraction filter which extracts the noise signal from the sound wave signal. The noise extraction filter may include a band pass filter. The noise extraction filter passes a signal of a desired band in a sound wave signal waveform.

Figure 9A:
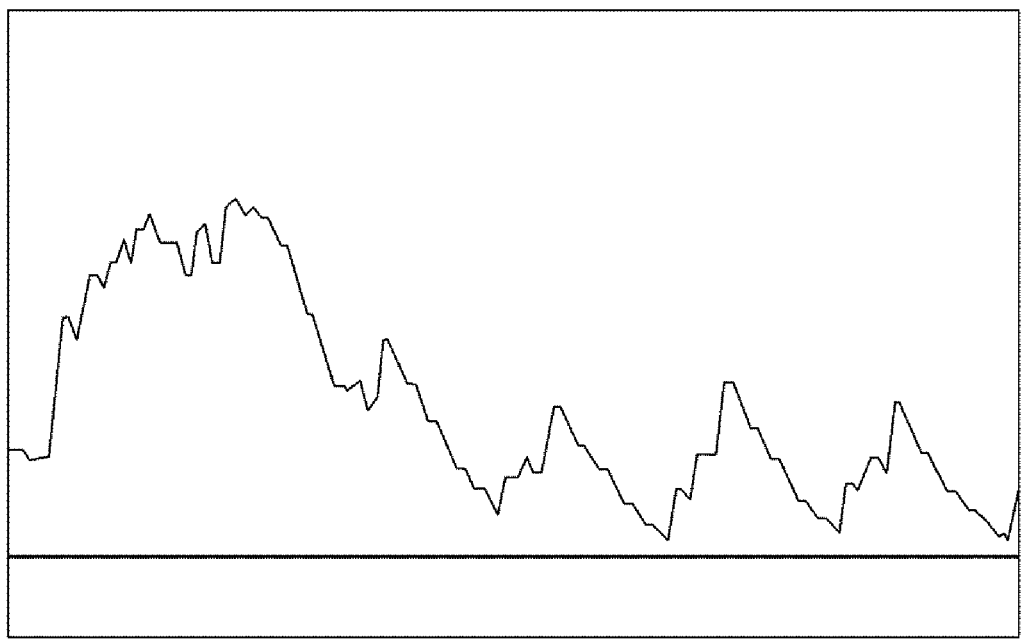
FIG. 9A is a diagram illustrating a waveform of a sound wave signal.
Figure 9B:
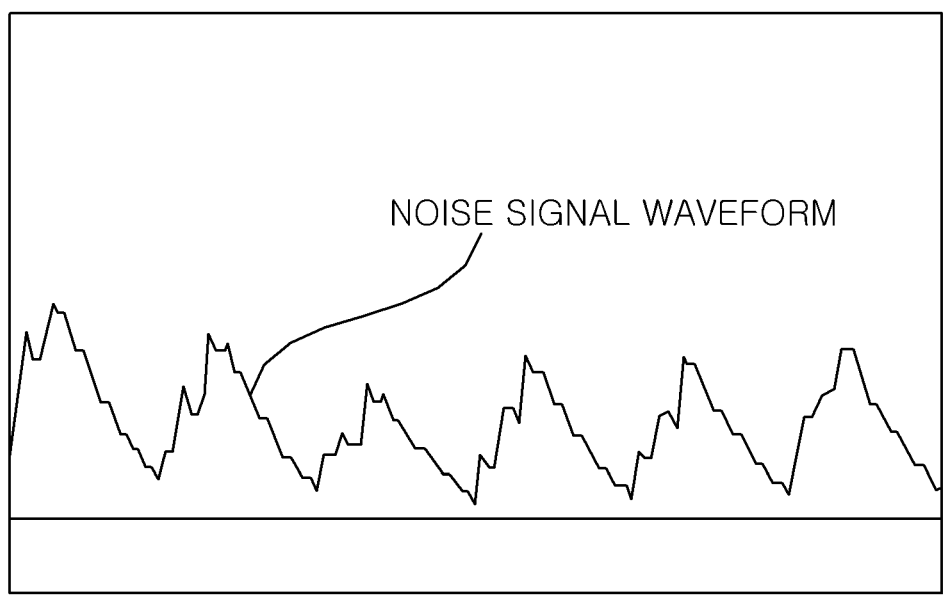
FIG. 9B is a diagram illustrating a waveform of a noise signal extracted from the sound wave signal.

FIG. 9A illustrates the sound wave signal waveform provided by the ultrasonic sensor unit 1721. The noise extraction filter extracts a noise signal waveform from the sound wave signal waveform as illustrated in FIG. 9B.

The boundary detector 1717 compares a frequency of the AC current applied to the boundary wire with a frequency of the noise signal and/or noise signal waveform to determine the boundary of the cleaning area.

Specifically, the boundary detector 1727 extracts the frequency of the noise signal waveform from the noise signal waveform and compares the frequency of the noise signal waveform with the frequency of the AC current applied to the boundary wire to detect the boundary. For example, when the frequency of the noise signal is 98% to 102% of the frequency of the AC current applied to the boundary wire, the boundary detector 1727 may determine the boundary as the boundary of the cleaning area. Preferably, when the frequency of the noise signal is the same as the frequency of the AC current applied to the boundary wire, the boundary detector 1727 may determine the boundary as the boundary of the cleaning area.

In the boundary wire 290, the electromagnetic wave is generated according to the frequency of the AC current, and when the frequency of the AC current is known, a frequency of the electromagnetic wave can be predicted. The electromagnetic wave is applied to the ultrasonic sensor unit 1721 as noise in the form of a waveform of an electromagnetic wave. From the noise signal, the boundary can be detected by matching the frequency of the AC current or the frequency of the electromagnetic wave.

Of course, if the noise signal is lower than a reference signal, the boundary detector 1727 may determine the noise as a general noise and may not determine the boundary as the boundary of the cleaning area. In addition, in a case where a constant waveform or frequency is not detected even when the noise signal is higher than the reference signal, the boundary detector 1727 may determine the noise as the general noise. The ultrasonic sensor module 172 may not send any signal to the controller 190 in a case where the noise is determined as the general noise.

As another example, when the frequency of the noise signal is included in a range of the reference frequency, the boundary detector 1717 may determine the boundary as the boundary of the cleaning area. The range of the reference frequency may be set based on the frequency of the AC current or the frequency of the electromagnetic wave.

The obstacle detector 1725 analyzes the sound wave signal output from the ultrasonic sensor unit 1721 to determine the obstacle. For example, the obstacle detector 1725 extracts the obstacle signal in which the noise signal is removed from the sound wave signal, and analyzes the obstacle signal to detect the obstacle.

Figure 9C:
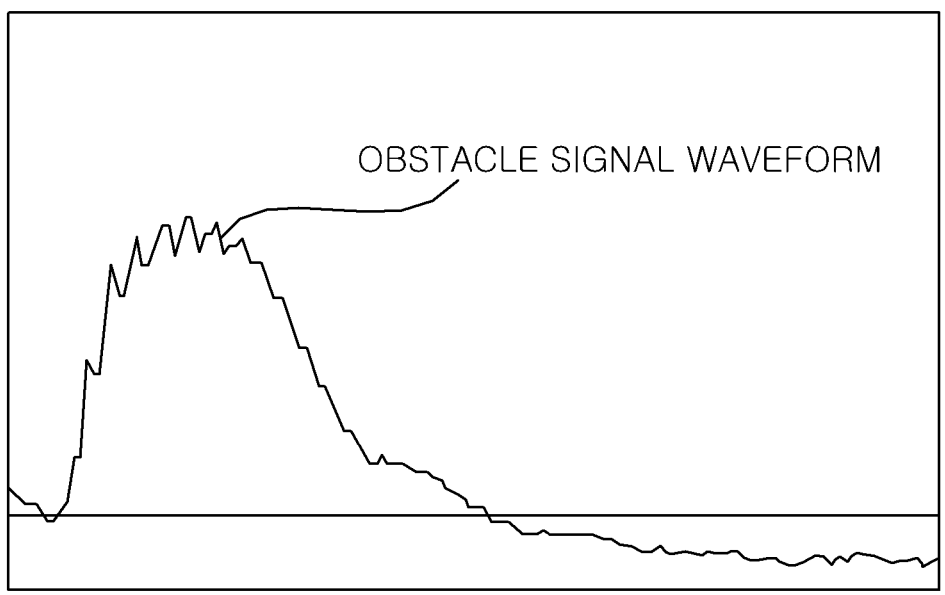
FIG. 9C is a diagram illustrating a waveform of an obstacle signal extracted from the sound wave signal.

The obstacle detector 1725 may include an obstacle extraction filter which extracts the obstacle signal from the sound wave signal. The obstacle extraction filter includes a band cutoff filter. The obstacle extraction filter blocks a signal of a desired band in the sound wave signal waveform. FIG. 9A illustrates the sound wave signal waveform provided by the ultrasonic sensor unit 1721. The obstacle extraction filter extracts the obstacle signal waveform from the sound wave signal waveform as illustrated in FIG. 9C.

When the obstacle detector 1725 extracts the obstacle signal waveform, a sound wave return time is converted into a distance, and thus, a distance to the obstacle can be calculated.

Therefore, the present disclosure determines the boundary of the cleaning area during a noise removal process of the ultrasonic sensor module 172, and thus, it is possible to correctly determine the boundary of the cleaning area while reducing a computational burden of the moving robot.

Figure 10:
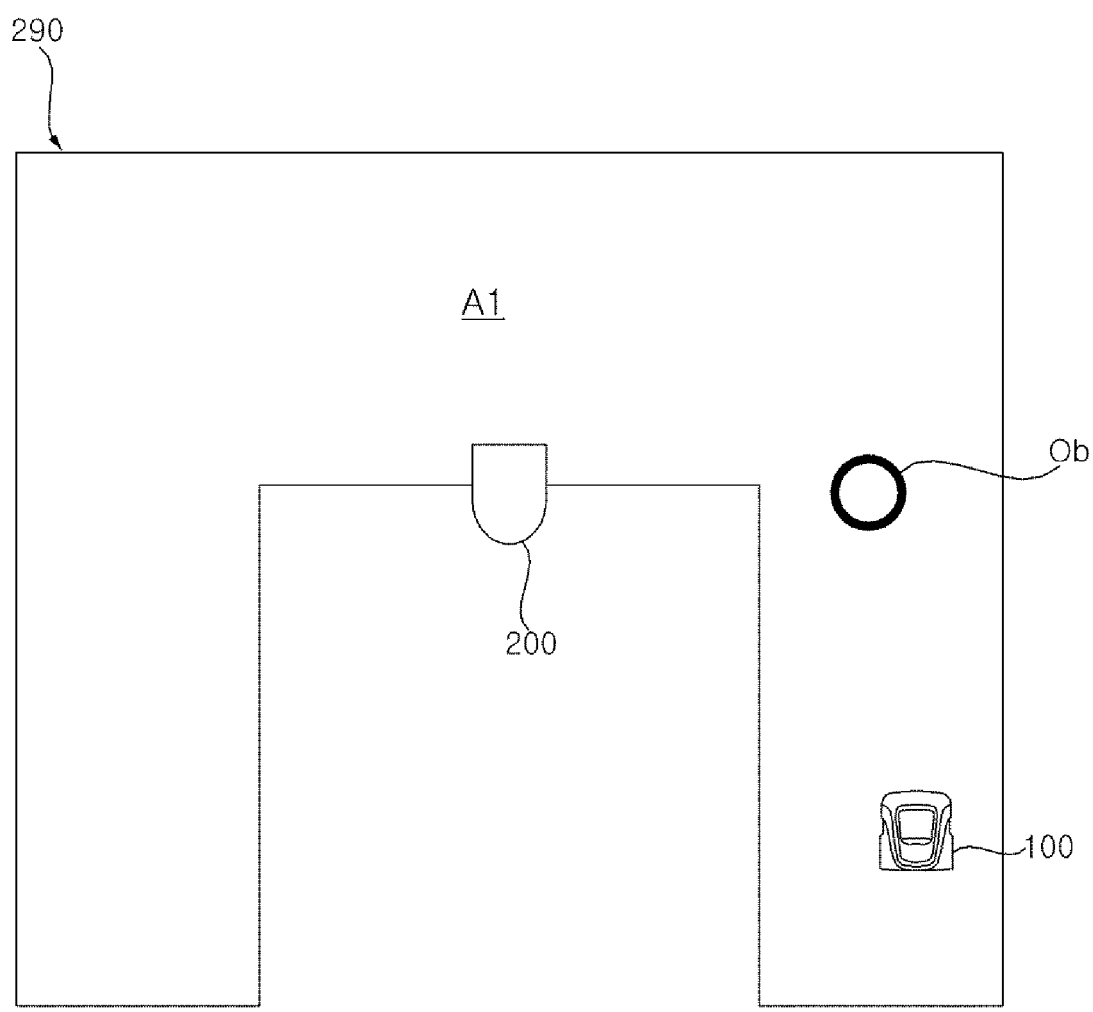
FIG. 10 is a diagram illustrating a moving robot system according to an embodiment of the present disclosure.

FIG. 10 is a diagram illustrating a moving robot 100 system according to an embodiment of the present disclosure. Referring to FIG. 10, the moving robot system of the present disclosure includes the boundary wire 290 defining the cleaning area A1 and the moving robot 100 which travels inside the traveling area. In addition, the moving robot system of the present disclosure may further include the docking device 200 in which the moving robot 100 is docked and charged.

The boundary wire 290 defining the boundary of the cleaning area defines a closed area on a horizontal plane along with the docking device 200.

The controller 190 controls the traveler (driving motor 123) while avoiding an obstacle Ob in the cleaning area A1 based on the boundary of the obstacle or/and cleaning area detected by the ultrasonic sensor module 172.

Figure 11:
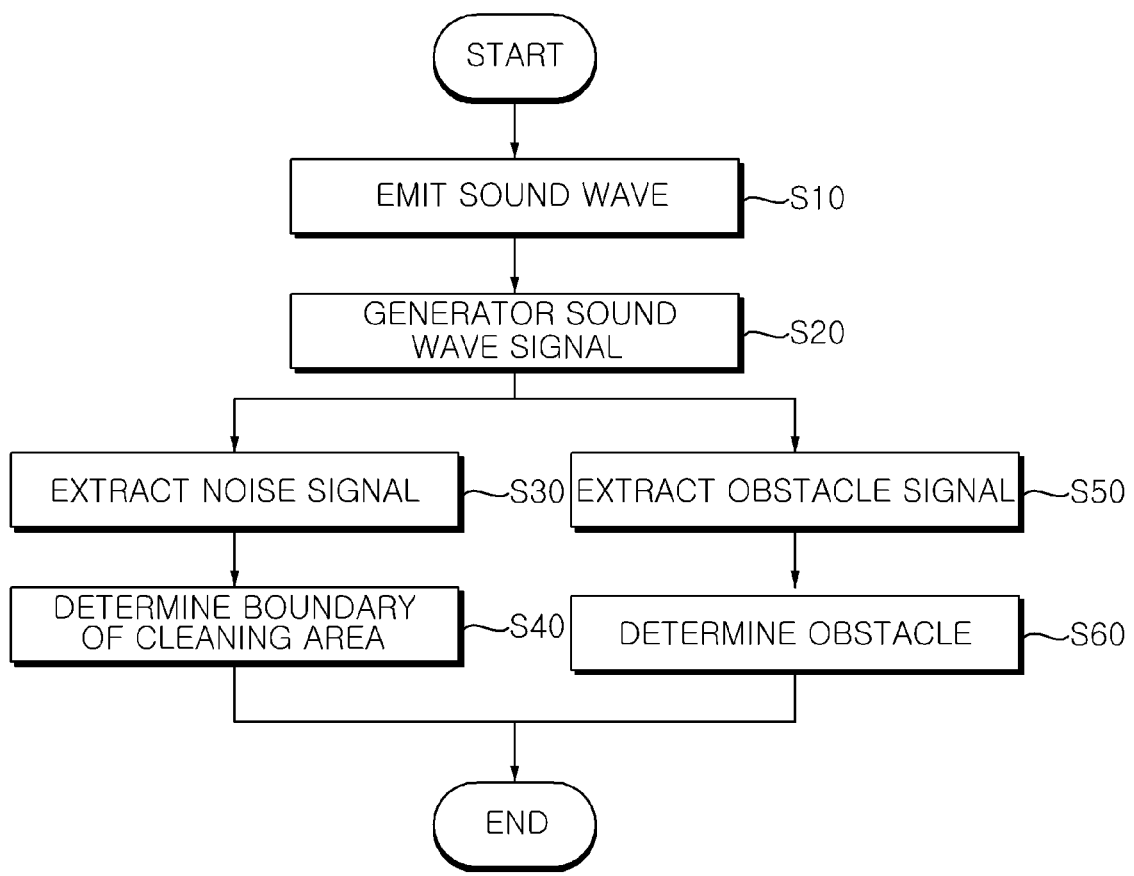
FIG. 11 is a flowchart illustrating a method of controlling a moving robot according to an embodiment of the present disclosure.

FIG. 11 is a flowchart illustrating a method of controlling a moving robot according to an embodiment of the present disclosure. Referring to FIG. 11, the method of controlling the moving robot 100 according to the embodiment of the present disclosure includes a step S10 of emitting a sound wave, a step S20 of receiving the sound wave which is reflected and returned to generate the sound wave signal, a step S30 of extracting the noise signal generated by the electromagnetic wave from the sound wave signal, and a step S40 of analyzing the noise signal to determine the boundary of the cleaning area.

In the step S10 of emitting the sound wave, the controller 190 controls the ultrasonic sensor unit 1721 so that the ultrasonic sensor unit 1721 emits the sound wave in the direction of the target.

In the step S20 of generating the sound wave signal, the controller 190 controls the ultrasonic sensor unit 1721 so that the ultrasonic sensor unit 1721 receives the sound wave which hits the target and is returned from the target to output the sound wave signal. Of course, the controller 190 can control the receiving amplifier 1723 to amplify the sound wave signal output from the ultrasonic sensor unit 1721.

In the step S30 of extracting the noise signal, the boundary detector 1717 extracts the noise signal generated by the electromagnetic wave generated by the boundary wire 290 defining the cleaning area in the sound wave signal.

In step S40 of determining the boundary of the cleaning area, the boundary detector 1727 compares the frequency of the AC current applied to the boundary wire with the frequency of the noise signal and/or noise signal waveform to determine the boundary of the cleaning area. The boundary detector 1717 extracts the frequency of the noise signal waveform from the noise signal waveform and compares the extracted frequency of the noise signal waveform with the frequency of the AC current applied to the boundary wire to detect the boundary. For example, when the frequency of the noise signal is 98% to 102% of the frequency of the AC current applied to the boundary wire, the boundary detector 1727 may determine the boundary as the boundary of the cleaning area. Preferably, when the frequency of the noise signal is the same as the frequency of the AC current applied to the boundary wire, the boundary detector 1727 may determine the boundary as the boundary of the cleaning area.

The control method of the moving robot 100 according to an embodiment of the present disclosure includes extracting an obstacle signal generated from an obstacle in a sound wave signal (S50); And determining an obstacle by analyzing the obstacle signal (S60).

The step S50 of extracting the obstacle signal and the step S60 of determining the obstacle may be performed simultaneously with or at a time different from the step S30 of extracting the noise signal and the step S40 of determining the boundary of the cleaning area.

In the step S50 of extracting the obstacle signal, the obstacle detector 1725 extracts the obstacle signal in which the noise signal is removed from the sound wave signal.

In the step S60 of determining the obstacle, the obstacle detector 1725 may analyze the obstacle signal to detect the obstacle. Specifically, when the obstacle detector 1725 extracts the obstacle signal waveform, the sound wave return time is converted to the distance, and the distance to the obstacle can be calculated.

The present disclosure detects (simultaneously in some cases) both the obstacle and the boundary of the cleaning area through the sound wave. Accordingly, there is no need for an additional sensor, and there is an advantage of reducing manufacturing cost.

Moreover, the present disclosure analyzes one sound wave signal from the ultrasonic sensor module and determines the boundary of the cleaning area and the obstacle. Accordingly, there is an advantage of reducing a computational burden of the controller.

In addition, the present disclosure does not have a separate sensor for detecting the boundary of the cleaning area, and thus, there is an advantage to reduce the weight and size of the moving robot.

The present disclosure simultaneously detects the obstacle and the boundary of the cleaning area through the sound wave. Accordingly, there is no need for an additional sensor, and there is an advantage of reducing manufacturing cost.

Moreover, the present disclosure analyzes one sound wave signal from the ultrasonic sensor module and determines the boundary of the cleaning area and the obstacle. Accordingly, there is an advantage of reducing a computational burden of the controller.

In addition, the present disclosure does not have a separate sensor for detecting the boundary of the cleaning area, and thus, there is an advantage to reduce the weight and size of the moving robot.

Although some specific embodiments have been described with reference to illustrated figures, it should be understood that numerous other embodiments can be devised by those skilled in the art that will fall within the spirit and scope of the principles of this disclosure. More particularly, numerous variations and modifications are possible in the described components, parts and/or arrangements of the described embodiments. In addition to variations and modifications in the components, parts and/or arrangements, alternative uses will also be apparent to those skilled in the art.

What is claimed is:

1. A mobile robot comprising:
a body;
a propulsion module configured to move the body, the propulsion module including a wheel and/or a motor;
an ultrasound sensor module configured to detect (a) an obstacle and (b) a boundary of a cleaning area; and
a controller configured to control the propulsion module based on the obstacle and the boundary detected by the ultrasonic sensor module,
wherein the ultrasound sensor module includes:
an ultrasonic sensor unit configured to (i) emit a sound wave, (ii) receive a reflected sound wave, and (iii) output a sound wave signal based on the received reflected sound wave,
an obstacle detector configured to analyze the sound wave signal output from the ultrasonic sensor unit to detect the obstacle, and
a boundary detector configured to analyze the sound wave signal output from the ultrasonic unit to determine the boundary of the cleaning area, and
wherein the boundary detector is configured to extract, from the sound wave signal, a noise signal of an electromagnetic wave generated by a boundary wire defining the cleaning area, and analyze the noise signal to determine the boundary of the cleaning area.

2. The mobile robot of claim 1, wherein the boundary detector is configured to compare a frequency of an AC current applied to the boundary wire with a frequency of the noise signal to determine the boundary of the cleaning area.

3. The mobile robot of claim 1, wherein when a frequency of the noise signal is about 98% to 102% of a frequency of an AC current applied to the boundary wire, the boundary detector determines a location of the boundary wire as the boundary of the cleaning area.

4. The mobile robot of claim 1, wherein when a frequency of the noise signal falls within a range of a reference frequency, the boundary detector determines a location of the boundary wire as the boundary of the cleaning area.

5. The mobile robot of claim 1, wherein the boundary detector includes a noise extraction filter configured to extract the noise signal from the sound wave signal.

6. The mobile robot of claim 5, wherein the noise extraction filter includes a band pass filter.

7. The mobile robot of claim 1, wherein the ultrasonic sensor module further includes a receiving amplifier configured to amplify the sound wave signal output from the ultrasonic sensor unit.

8. The mobile robot of claim 1, wherein the obstacle detector is configured to extract an obstacle signal from the sound wave signal by removing the noise signal from the sound wave signal, and analyze the extracted obstacle signal to detect the obstacle.

9. The mobile robot of claim 8, wherein the obstacle detector includes an obstacle extraction filter configured to extract the obstacle signal from the sound wave signal.

10. The mobile robot of claim 9, wherein the obstacle extraction filter includes a band cutoff filter.

11. A mobile robot comprising:
a body;
a propulsion module configured to move the body on a cleaning area, the propulsion module including a wheel and/or a motor;
an ultrasound sensor module configured to detect a boundary of the cleaning area; and
a controller configured to control the propulsion module based on the detected boundary,
wherein the ultrasound sensor module includes:
an ultrasonic sensor unit configured to (i) emit a sound wave, (ii) receive a reflected sound wave from a target, and (iii) output a sound wave signal, and
a boundary detector configured to analyze the sound wave signal output from the ultrasonic unit to determine the boundary of the cleaning area, and
wherein the boundary detector is configured to extract a noise signal of an electromagnetic wave generated by a boundary wire defining the cleaning area, from the sound wave signal, and analyze the noise signal to determine the boundary of the cleaning area.

12. The mobile robot of claim 11, wherein the boundary detector is configured to compare a frequency of an AC current applied to the boundary wire with a frequency of the noise signal to detect the boundary of the cleaning area.

13. The mobile robot of claim 11, wherein when a frequency of the noise signal is about 98% to 102% of a frequency of an AC current applied to the boundary wire, the boundary detector determines a location of the boundary wire as the boundary of the cleaning area.

14. The mobile robot of claim 11, wherein when a frequency of the noise signal falls within a range of a reference frequency, the boundary detector determines a location of the boundary wire as the boundary of the cleaning area.

15. The mobile robot of claim 11, wherein the boundary detector includes a noise extraction filter configured to extract the noise signal from the sound wave signal.

16. The mobile robot of claim 15, wherein the noise extraction filter includes a band pass filter.

17. The mobile robot of claim 11, wherein the ultrasonic sensor module further includes a receiving amplifier configured to amplify the sound wave signal output from the ultrasonic sensor unit.

18. A method of controlling a mobile robot, comprising:
emitting a sound wave;
receiving a reflected sound wave, wherein the reflected sound wave is the emitted sound wave reflected from a target and a boundary wire defining a cleaning area;
generating a sound wave signal based on the received reflected sound wave;
extracting a noise signal of an electromagnetic wave generated by the boundary wire from the sound wave signal; and
analyzing the noise signal to determine a boundary of a cleaning area.

* * * * *